(12) United States Patent
Bleile et al.

(10) Patent No.: US 6,945,234 B2
(45) Date of Patent: Sep. 20, 2005

(54) METHOD FOR OPERATING AN INTERNAL COMBUSTION ENGINE HAVING A COMPRESSOR

(75) Inventors: Thomas Bleile, Stuttgart (DE); Michael Scheidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 10/658,264

(22) Filed: Sep. 10, 2003

(65) Prior Publication Data

US 2004/0115064 A1 Jun. 17, 2004

(30) Foreign Application Priority Data

Sep. 10, 2002 (DE) ........................................ 102 41 892

(51) Int. Cl.⁷ .......................... F02B 37/12; F02B 39/16; F02D 41/00; F02D 45/00; F04B 49/00
(52) U.S. Cl. ...................... 123/559.1; 60/611; 123/564; 701/100
(58) Field of Search .............................. 123/559.1, 564; 60/602, 611; 701/100

(56) References Cited

U.S. PATENT DOCUMENTS

| | | | | |
|---|---|---|---|---|
| 6,050,093 A | * | 4/2000 | Daudel et al. ................ | 60/602 |
| 6,539,714 B1 | * | 4/2003 | Wang .......................... | 60/611 |
| 6,584,772 B2 | * | 7/2003 | Haupt et al. .................. | 60/602 |
| 6,637,205 B1 | * | 10/2003 | Ahmad et al. ................ | 60/611 |
| 6,644,029 B2 | * | 11/2003 | Weinreuter .................. | 60/602 |

* cited by examiner

*Primary Examiner*—Sheldon J Richter
(74) *Attorney, Agent, or Firm*—Walter Ottesen

(57) ABSTRACT

The invention is directed to a method for operating an internal combustion engine (1) having a compressor (5) which method makes possible an actualization of a pump limit of the compressor (5). A pressure ratio across the compressor (5) is limited in dependence upon a mass flow through the compressor (5) by means of the pump limit in order to prevent a pumping of the compressor (5). In at least one operating state of the engine (1), a check is made as to whether a pumping of the compressor (5) occurs. The pump limit is corrected in dependence upon the test results.

10 Claims, 3 Drawing Sheets

METHOD FOR OPERATING AN INTERNAL COMBUSTION ENGINE HAVING A COMPRESSOR

BACKGROUND OF THE INVENTION

Methods are known for operating an internal combustion engine having a compressor, especially a turbocharger. A pressure ratio across the compressor is limited by means of a pump limit in dependence upon a mass flow through the compressor in order to prevent a pumping of the compressor. If the pressure ratio exceeds the pump limit, then this leads to an intense oscillation of the fresh air mass supplied to the engine. This becomes noticeable from a pulsating noise which is based on the so-called charger pumping or compressor pumping. The pump limit defines the limit of a compressor characteristic field starting from which the compressor characteristic field is no longer defined. The compressor characteristic field determines the permissible pressure ratio across the compressor in dependence upon the mass flow through the compressor. In FIG. 3, a compressor characteristic field is shown by way of example wherein the pressure ratio is plotted against a corrected compressor mass flow in pounds/min. In the compressor characteristic field of FIG. 3, isolines of constant engine rpm nmot of the engine are presented by way of example as well as isolines of constant rpm nv of the compressor of a turbocharger. With respect to the engine rpm nmot, isolines for 1,000, 1,500 and 2,000 rpm and, for the compressor rpm nv, isolines having 85,000, 105,000, 125,000, 145,000 and 165,000 rpm are plotted. The pump limit is shown by a broken line in the compressor characteristic field of FIG. 3. The pump limit line intersects with the isoline for the engine rpm nmot=1,000 rpm. When, for example, the compressor rpm nv=145,000 rpm and the engine rpm nmot=1,500 rpm, then the pressure ratio lies below the pump limit and therefore in a permissible range. For this reason, there is no compressor pumping. When the internal combustion engine drives a vehicle and the driver shifts into the next higher gear whereat the engine rpm nmot drops to 1,000 rpm, this means, for a constant compressor rpm nv=145,000 rpm, a change of the pressure ratio beyond the pump limit to the isoline for nmot=1,000 rpm. The pressure ratio across the compressor would thereby no longer be in the permissible range so that compressor pumping would occur. For this reason, in this case, the pressure ratio on the isoline nmot=1,000 rpm must be dropped until it is again in the permissible range, that is, it lies below the pump limit. For this purpose, the compressor rpm nv can be correspondingly reduced to a value which is approximately 115,000 rpm or less.

The pressure ratio is defined as the ratio of the pressure in flow direction downstream of the compressor to the pressure in flow direction forward of the compressor. The compressor mass flow plotted along the abscissa is corrected in dependence upon the pressure and the temperature of the compressor mass flow in flow direction forward of the compressor. The pressure in flow direction downstream of the compressor is characterized as charge-air pressure and the pressure in flow direction forward of the compressor is characterized as intake pressure. There are two possibilities for triggering the compressor pumping. For constant charge-air pressure but low ambient pressure, for example at high elevation, clearly higher compressor pressure ratios result when one proceeds from the consideration that the intake pressure corresponds approximately to the ambient pressure. In this way, the pressure ratio across the compressor can increase beyond the pump limit so that a compressor pumping is triggered. This compressor pumping is characterized as static compressor pumping. The static compressor pumping can be prevented in that a desired value for the charge-air pressure is so selected over all operating ranges of the internal combustion engine that the pressure ratio even for low ambient pressures has a safety spacing from the pump limit. Unit scattering and deterioration effects must be considered for the dimensioning of the safety spacing. In this way, the operating range of the compressor in the compressor characteristic field is limited.

For a rapidly falling engine rpm nmot, a combination of low engine rpm nmot and a high compressor rpm nv can occur which likewise can effect a pressure ratio above the pump limit and therefore a compressor pumping and is characterized as a dynamic compressor pumping.

SUMMARY OF THE INVENTION

The method of the invention is for operating an internal combustion engine and affords the advantage compared to the foregoing that a check is made in at least one operating state of the engine as to whether a pumping of the compressor occurs and that the pump limit is corrected in dependence upon the check result. In this way, the pump limit can be made current during the operation of the engine. A safety spacing for limiting the desired value for the charge-air pressure, which considers the unit scattering and deterioration effects of the compressor, is then no longer necessary. With the continuous actualization or learning of the pump limit during the operation of the engine, the compressor can be utilized in the entire permissible range of the compressor characteristic field. The desired value for the charge-air pressure can be so selected that pressure ratios across the compressor are possible which come very close to the pump limit without the safety spacing because the unit scattering and the deterioration effects of the compressor are considered by the actualization of the pump limit. In this way, the compressor can be used in a greater range of the compressor characteristic field without the pump limit being exceeded and without disturbing noises occurring or increased material load because of the compressor pumping.

It is especially advantageous when the occurrence of the pumping is detected in dependence upon the amplitude of a fresh air mass, which is supplied to the engine and oscillates at a pregiven frequency. In this way, an especially reliable possibility is provided to detect an occurrence of the compressor pumping.

A further advantage is that the amplitude of the oscillating fresh air mass is determined by means of a discrete Fourier transformation of a scanned signal sequence of a detected fresh air mass. This defines a simple and rapid possibility for determining the amplitude.

A further advantage is that, in a first range of the amplitude, a first state of the pumping is detected and, in a second range of the amplitude, a second state of the pumping is detected. The amplitudes in the second range are greater than in the first range. In this way, two states of compressor pumping with different intensity can be distinguished. For a suitable selection of the amplitude ranges, the first state of pumping can be characterized in that the compressor pumping is not audible or hardly audible. In contrast, in the second state of pumping, the pumping is more audible. If the compressor pumping is already detected in the first state of the pumping, then countermeasures can be initiated before the second state of pumping is reached. In this way, a detection of the compressor pumping and the initiation of corresponding countermeasures is made possible before the compressor pumping becomes disturbingly noticeable.

A further advantage is that the pump limit is reduced by a first pregiven value for a pregiven time when an amplitude is detected in the first range. In this way, reaching the second state of compressor pumping is effectively prevented.

A further advantage is that, with the correction of the pump limit, a new pump limit is formed in that a previous pump limit is reduced by a second pregiven value. In this way, the pump limit can be made current in an especially simple manner and be transferred into an area whereat a compressor pumping is not expected to occur.

A further advantage is that, in a new driving cycle and independently of the check as to whether the pump limit is corrected because of the pumping of the compressor, a new pump limit is formed in that a previous pump limit is raised by a third pregiven value. In this way, the situation is achieved that the operating range of the compressor in the compressor characteristic field is again expanded in order to hold limitations as low as possible.

Here, it is advantageous when the second pregiven value is selected greater than the third pregiven value. In this way, a comparatively greater limiting of the operating range of the compressor in the compressor characteristic can be realized when detecting compressor pumping in order to realize an adequate safety spacing which can again be successively reduced with the aid of the third pregiven value in order to find and learn the actual pump limit.

A further advantage is that a correction of the pump limit is only carried out when the new pump limit which forms does not exceed a pregiven course of the pump limit. In this way, it is ensured that the pump limit cannot be raised arbitrarily especially not above a course in the form of an original pump limit which course is pregiven, for example, by the manufacturer of the compressor. In this way, it is ensured that a compressor pumping and a new learning operation do not occur unnecessarily.

A further advantage is that the correction of the pump limit can be carried out in sections in dependence upon the mass flow through the compressor. In this way, the pump limit can be made current more accurately. The precision increases with reducing magnitudes of the sections.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
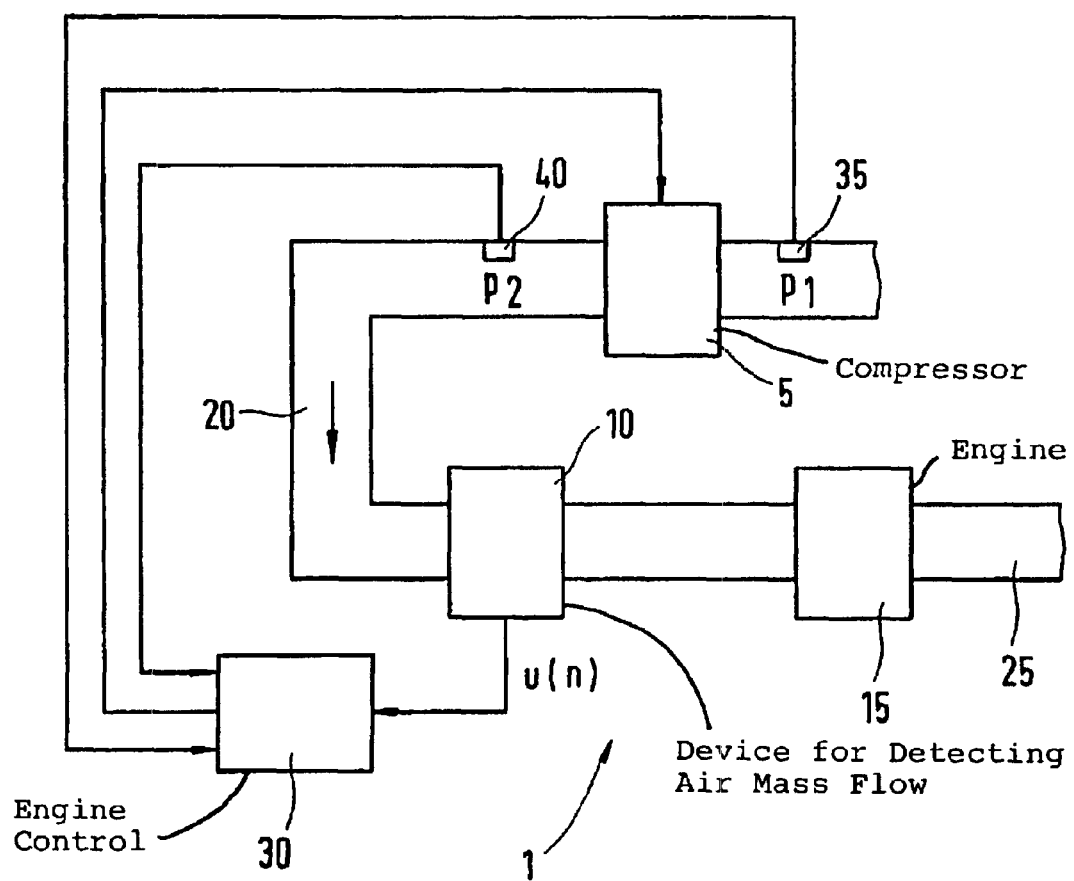
FIG. 1 is a block circuit diagram of an internal combustion engine.

In FIG. 1, reference numeral 1 identifies an internal combustion engine, for example, of a motor vehicle. Fresh air is inducted via an air system 20 and supplied to an engine 15 including at least one cylinder. The flow direction of the fresh air is indicated by an arrow. The exhaust gas, which results from the combustion in the engine 15, is supplied to an exhaust-gas system 25. In the air system 20, a compressor 5 is mounted which, for example, can be a compressor of an exhaust-gas turbocharger or an electrically driven compressor or a compressor driven by a crankshaft of the engine 15. The pressure in the air system 20 in flow direction ahead of the compressor 5 is identified in FIG. 1 by $p_1$. The pressure in the air system 20 in flow direction downstream of the compressor 5 is identified in FIG. 1 by $p_2$. The pressure ratio across the compressor 5 is therefore $p_2/p_1$. The pressure $p_2$ is therefore the charge-air pressure and $p_1$ is the intake pressure. A device 10 for detecting the air mass flow is mounted in the air system 20 behind the compressor 5 in flow direction. The device 10 can, for example, be a hot-film air-mass sensor. This sensor measures the fresh air mass or the fresh air mass flow in the air system 20 and therefore the mass flow through the compressor 5.

Furthermore, a first pressure sensor 35 is provided in the air system 20 in flow direction ahead of the compressor 5 which detects the intake pressure $p_1$. In this example, a second pressure sensor 40 is furthermore provided in the air system 20 in flow direction behind the compressor 5 which measures the charge-air pressure $p_2$. Furthermore, an engine control 30 is provided which is connected to the hot-film air-mass sensor 10, the first pressure sensor 35 and the second pressure sensor 40 and therefore receives the detected fresh air mass, the measured intake pressure $p_1$ and the measured charge-air pressure $p_2$. Furthermore, the engine control 30 drives the compressor 5 in order to adjust a wanted compressor rpm nv.

In FIG. 1, only components of the internal combustion engine 1 are shown which are needed for an understanding of the invention.

If the compressor pumping is triggered, then the fresh air mass oscillates in the air system 20 at a frequency $f_D$ characteristic of the air system 20. The characteristic frequency $f_D$ can be determined in a test operation of the engine 1 wherein the compressor pumping is deliberately initiated. The characteristic frequency $f_D$ is then stored as a pregiven frequency in the engine control 30 or is stored in a memory assigned to the engine control 30.

There are two states for the static compressor pumping. A first state of the compressor pumping is characterized in that the fresh air mass oscillates at low amplitudes so that the compressor pumping is not audible or is only barely audible. In the second state of the compressor pumping, the fresh air mass oscillates at a greater amplitude and the compressor pumping is therefore more audible. The two states distinguish from each other therefore in the magnitude of the amplitude of the oscillating fresh air mass. The pump limit of the compressor 5 is learned or made current via the first state of the compressor pumping.

The amplitude of the oscillating fresh air mass at the characteristic frequency $f_D$ is determined via a discrete Fourier transformation DFT and from this, the two states are distinguished.

The signal sequence u(n) defines the fresh air mass detected by the hot-film air-mass sensor 10. The signal sequence u(n) is scanned in the engine control 30 at a scanning frequency $f_S$. The scanning frequency $f_S$ is also characterized as the detection frequency of the fresh air mass. The amplitude of the signal component having the characteristic frequency $f_D$ is sought. The frequency $f_D$ is, as described, the characteristic frequency with which the fresh air mass oscillates when exceeding the pump limit.

The second power of the amplitude of the signal sequence u(n) at the characteristic frequency $f_D$ is as follows:

$$\text{Amplitude}^2 = a^2 + b^2 \qquad (1)$$

wherein:

$$a = \frac{2}{k} * \sum_{i=1}^{k} u(i) * \cos\left(2\pi * \frac{i}{k}\right) \quad (2)$$

and $$b = \frac{2}{k} * \sum_{i=1}^{k} u(i) * \sin\left(2\pi * \frac{i}{k}\right) \quad (3)$$

wherein $$k = \frac{f_s}{f_D} \quad (4)$$

The first state of compressor pumping is reached when the amplitude of the signal component having the characteristic frequency $f_D$ is greater than a minimum value "amplitude$_{min}$" and less than a maximum value "amplitude$_{max}$". Accordingly, the following inequality applies:

$$\text{Amplitude}_{min} < |\sqrt{\text{Amplitude}^2}| < \text{Amplitude}_{max} \quad (5)$$

The second state of the compressor pumping is reached when the amplitude of the signal component having the characteristic frequency $f_D$ is greater than the maximum value "amplitude$_{max}$", so that the following applies:

$$|\sqrt{\text{Amplitude}^2}| > \text{Amplitude}_{max} \quad (6)$$

With the inequality (5), a first range of the amplitude is defined and with the inequality (6), a second range of the amplitude is defined. The first range of the amplitude is assigned to the first state of the compressor pumping and the second range of the amplitude is assigned to the second state of the compressor pumping. The maximum value "amplitude$_{max}$" is so selected that the amplitudes in the first range are not audible or only slightly audible; whereas, the amplitudes in the second range are much more audible.

Figure 3:
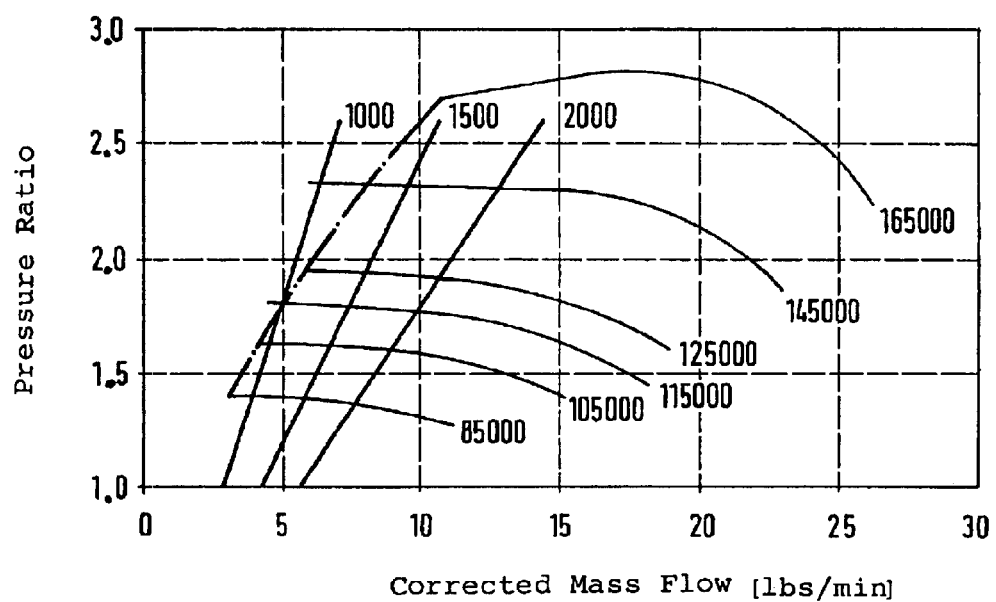
FIG. 3 is a compressor characteristic field.

The pump limit, which is characteristic for the compressor 5, is pregiven by the manufacturer and is stored in the engine control apparatus or in a memory assigned to the engine control apparatus 30 as a pregiven trace of the pressure ratio $p_2/p_1$ as a function of the fresh air mass flow which is also the mass flow through the compressor 5. This mass flow through the compressor 5 can be corrected via the intake pressure $p_1$ and the temperature in flow direction ahead of the compressor in a manner known per se. From this pregiven course of the pressure ratio or the pump limit, a maximum permissible static desired value for the charge-air pressure $p_2$ as a function of the mass flow through the compressor 5 is determined. Here, one proceeds from a minimum possible intake pressure $p_1$ which can occur during operation of the engine 1, for example, in dependence upon the elevation above sea level. The intake pressure $p_1$ can correspond approximately to the ambient pressure. The learning of the pump limit can then take place segment-wise. For this purpose, the pump limit is subdivided into several segments as a function of the air mass flow which segments can be learned separately. The course of the pregiven pump limit is plotted, as described, in the characteristic field of FIG. 3 by broken lines. If the amplitude of the signal component having the characteristic frequency $f_D$ is recognized in the first range via the described DFT algorithm, and therefore the first state of the compressor pumping is recognized, then a learning algorithm is triggered. The pump limit is then reduced for a short time, that is, the pump limit is reduced for a pregiven time by a first pregiven value $\Delta(p_2/p_1)_1$ in order to prevent the occurrence of the second state of the compressor pumping.

After the pregiven time has elapsed, the pump limit is again raised. The pregiven time is selected at least so long that, because of the time constant for a control of the charge-air pressure $p_2$ by driving the compressor 5 and because of the inertia of the compressor 5, an increase of the amplitude of the signal component having the characteristic frequency $f_D$ into the second range and therefore more audible compressor pumping can be avoided. The control of the charge-air pressure $p_2$ takes place in a manner known per se. The pregiven time can, for example, be determined in a test run of the engine 1 and can be so applied that an increase of the amplitude of the signal component having the characteristic frequency $f_D$ into the second range can just be avoided. The first pregiven value $\Delta(p_2/p_1)_1$ can likewise be applied in a test operation of the engine in such a manner that a sufficient safety spacing of the instantaneous pressure ratio to the pump limit is reached during the pregiven time in order to prevent the second state of the compressor pumping. The first pregiven value $\Delta(p_2/p_1)_1$ and the pregiven time can likewise be stored in the engine control 30 or can be stored in a memory assigned to the engine control 30.

While the pump limit is actually reduced for the pregiven time by the first pregiven value $\Delta(p_2/p_1)_1$, a new pump limit is learned in that the pump limit as a function of the mass flow through the compressor 5, which is originally pregiven by the manufacturer or was previously learned and stored in the engine control 30 or in a memory assigned to the engine control 30, is reduced by a second pregiven value $\Delta(p_2/p_1)_2$. After the elapse of the pregiven time, the pump limit, which is actually reduced by the first pregiven value $\Delta(p_2/p_1)_1$, is raised to the newly learned pump limit. The newly learned pump limit is stored in the engine control 30 or in the memory assigned to the engine control 30 and replaces the previously learned pump limit or the course for the pump limit pregiven originally by the manufacturer. The second pregiven value $\Delta(p_2/p_1)_2$ can likewise be applied in a test run of the engine 1 in such a manner that the newly learned pump limit ensures an adequate safety distance or space to the first state of the compressor pumping and therefore ensures also a sufficient safety spacing to the second state of the compressor pumping so that one must not expect a compressor pumping when applying the newly learned pump limit.

In the engine control 30 or in the memory assigned thereto, either the particular newly learned pump limit or a particular newly learned corrective value is stored which reduces the original pump limit, which is pregiven originally by the manufacturer, to the newly learned pump limit. The described learning process can be carried out for the entire course of the pump limit as a function of the fresh air mass flow or, as described, the learning operation can be carried out in segments. The pump limit for different segments of the fresh air mass flow can be learned separately. The first pregiven value $\Delta(p_2/p_1)_1$ and/or the second pregiven value $\Delta(p_2/p_1)_2$ can be selected equal for all segments of the fresh air mass flow and can, for example, be applied for an exemplary segment in a test run of the engine 1. Alternatively, the first pregiven value $\Delta(p_2/p_1)_1$ and/or the second pregiven value $\Delta(p_2/p_1)_2$ can be applied and pregiven differently for different segments of the fresh air mass flow. After the elapse of the pregiven time, the newly learned pump limit is actually applied over the entire range of the fresh air mass flow or is applied only in the segment wherein the pump limit was newly learned and in which the current air mass flow lies. The fresh air mass flow corresponds, as described, to the mass flow through the compressor 5 and is characterized as compressor mass flow and can be corrected in the manner described in dependence upon the intake pressure $p_1$ and/or the temperature in the flow direction ahead of the compressor 5. The storage of the newly learned pump limit or the newly learned corrective values takes place, as described, in the engine control 30 or in the memory assigned to the engine control 30, for example, in a non-volatile manner so that the corresponding data remains stored even after a stop of the engine. The stored values for the newly learned pump limit, which is determined segment-wise as may be required, or the newly learned corrective values for correcting the course of the pump limit, which was pregiven originally by the manufacturer, are read into the engine control 30 during initialization. With the initialization of the engine control 30, the so read-in and newly learned pump limit or the newly learned corrective values are additively corrected by a third pregiven value $\Delta(p_2/p_1)_3$. In this way, it is achieved that the pump limit again approaches step-wise the course pregiven originally by the manufacturer. The third pregiven value $\Delta(p_2/p_1)_3$ can be selected less than the second pregiven value so that, on the one hand, a complete compensation of the previous reduction of the pump limit is prevented and, on the other hand, a fine adjustment of the pump limit can be realized. The pump limit can be adjusted that much more precisely the smaller the third applicable value $\Delta(p_2/p_1)_3$ is. On the other hand, for such a fine adjustment, that much more time is needed the smaller the pregiven value $\Delta(p_2/p_1)_3$ is selected. The third pregiven value $\Delta(p_2/p_1)_3$ can also be selected to be the same for the entire course of the pump limit as a function of the fresh air mass flow or different from segment to segment. The third pregiven value $\Delta(p_2/p_1)_3$ is also stored in the engine control 30 or in a memory assigned to the engine control 30.

It can be provided that the engine control 30 carries out the additive control with the third pregiven value $\Delta(p_2/p_1)_3$ only when, in this way, the course of the pump limit, which is pregiven originally by the manufacturer, is not exceeded.

Figure 2:
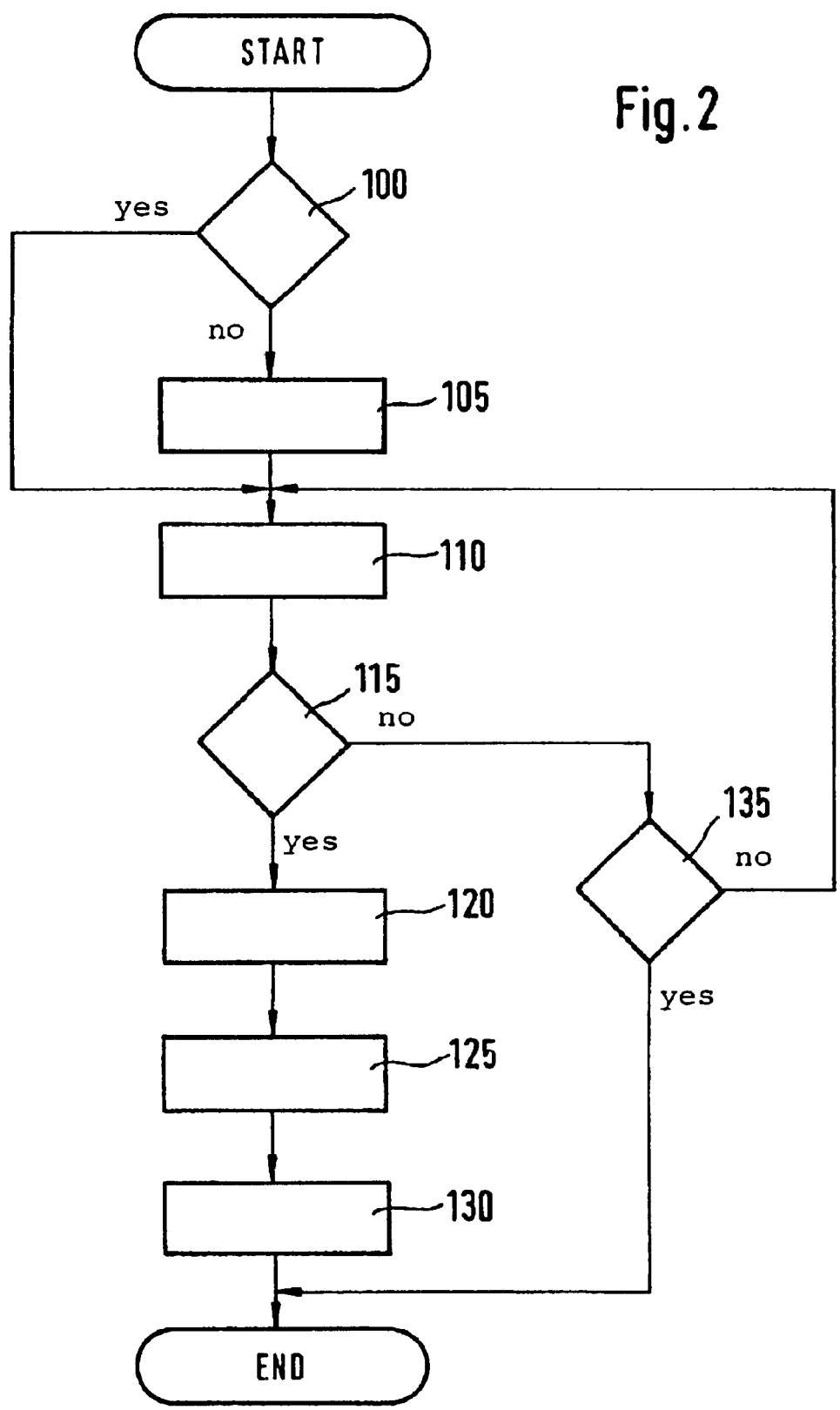
FIG. 2 is a flowchart for explaining the method of the invention.

The initialization of the engine control 30 can take place one time for each new engine start and therefore for each new driving cycle. The sequence of the method of the invention is described in greater detail hereinafter with respect to the flowchart of FIG. 2.

The described sequence can be applied for the learning of the complete course of the pump limit as well as for the segment-wise learning of the pump limit. In the last case, the sequence must be executed for each single segment of the air mass flow. The program can, for example, be started with each start of the engine 15. The program sequence is described for an example of the learning of a corrective value for the pump limit. With the start of the engine 15, the engine control 30 is also initialized. As described, the corrective value learned up to now is read out of its memory. The pump limit is the course of the pump limit pregiven originally by the manufacturer. In this way, the read-in corrective value learned up to now is equal to 0 at the first start of the engine since no learning operation has yet taken place. At program point 100, the engine control 30 checks whether the corrective value, which is learned up to now, is less than the third pregiven value $\Delta(p_2/p_1)_3$. If this is the case, then the program branches to program point 110; otherwise, the program branches to program point 105.

At program point 105, a newly learned corrective value is formed in that the third pregiven value $\Delta(p_2/p_1)_3$ is subtracted from the corrective value learned up to now. With the newly learned corrective value, the memory for the corrective value learned up to now is overwritten. Thereafter, the engine control 30 outputs a new pump limit in that the engine control subtracts the corrective value, which was newly learned at program point 105, from the pump limit which is pregiven originally by the manufacturer. Thereafter, the program branches to program point 110. At program point 110, the engine control 30 computes the amplitude of the signal component of the fresh air mass, which is measured by the hot-film air-mass sensor, by means of the discrete Fourier transformation. This measured air mass flow has the characteristic frequency $f_D$. Thereafter, the program branches to program point 115.

At program point 115, the engine control checks whether the amplitude lies in the first range. If this is the case, then the program branches to program point 120; otherwise, the program branches to program point 135.

At program point 135, the engine control 30 checks whether the current driving cycle was ended, that is, whether the engine 15 was switched off. If this is the case, then there is a movement out of the program; otherwise, the program branches back to program point 110.

At program point 120, the engine control 30 reduces the current pump limit by the first pregiven value $\Delta(p_2/p_1)_1$ and then starts a timer. Thereafter, the program branches to program point 125. At program point 125, the engine control 30 reads out the memory for the corrective value learned up to now (which is actualized if required at program point 105) and adds the second pregiven value $\Delta(p_2/p_1)_2$ to this value. In this way, a new corrective value is learned and is stored in the memory for the corrective value learned up to now. For a new program runthrough, a current corrective value is available. Thereafter, the program branches to program point 130.

At program point 130, the engine control 30 outputs a new pump limit in that the engine control subtracts the corrective value, which was newly learned at program point 125, from the pump limit which was pregiven originally by the manufacturer. The input of the new pump limit by the engine control 30 takes place when the timer, which was started at program point 120, has reached the pregiven time. Thereafter, there is a movement out of the program.

A purposeful selection for the order of magnitude of the pregiven values can be carried out as follows:

$$\Delta(p_2/p_1)_1 > \Delta(p_2/p_1)_2 > \Delta(p_2/p_1)_3$$

The pump limit can be learned in the manner described in each operating state of the internal combustion engine 1 in which the engine 15 runs. The detection as to whether the engine 15 runs or stands still can, for example, be determined with the aid of an rpm sensor (not shown in FIG. 1) which detects the rpm of the engine 15 and transmits the same to the engine control 30. In this way, the engine control 30 can determine whether the engine 15 was started in order to start the program of FIG. 2 in the manner described or whether the engine 15 is switched off and a driving cycle was ended in order to move out of the program of FIG. 2 after the inquiry at program point 135.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine having a compressor, the method comprising the steps of:
   limiting a pressure ratio across said compressor in dependence upon a mass flow through said compressor utilizing a pump limit to prevent a pumping of said compressor;

making a check in at least one operating state of said engine as to whether a pumping of said compressor occurs; and, correcting said pump limit in dependence upon the result of said check.

2. The method of claim 1, wherein a new pump limit is formed when the pump limit is corrected in that a previous pump limit is reduced by a second pregiven value.

3. The method of claim 1, wherein a correction of said pump limit is only carried out when the newly forming pump limit does not exceed a pregiven course of said pump limit.

4. A method for operating an internal combustion engine having a compressor, the method comprising the steps of:

limiting a pressure ratio across said compressor in dependence upon a mass flow through said compressor utilizing a pump limit to prevent a pumping of said compressor;

making a check in at least one operating state of said engine as to whether a pumping of said compressor occurs;

correcting said pump limit in dependence upon the result of said check; and, detecting the occurrence of said pumping in dependence upon the amplitude of a fresh air mass which is supplied to said engine and oscillates at a pregiven frequency.

5. The method of claim 4, comprising the further step of determining said amplitude utilizing a discrete Fourier transformation of a scanned signal sequence of a detected fresh air mass.

6. The method of claim 4, wherein, in a first range of said amplitude, a first state of said pumping is detected and, in a second range of said amplitude, a second state of said pumping is detected; and, the amplitudes in said second range are greater than in said first range.

7. The method of claim 6, wherein said pump limit is reduced for a pregiven time by a first pregiven value.

8. A method for operating an internal combustion engine having a compressor, the method comprising the steps of:

limiting a pressure ratio across said compressor in dependence upon a mass flow through said compressor utilizing a pump limit to prevent a pumping of said compressor;

making a check in at least one operating state of said engine as to whether a pumping of said compressor occurs;

correcting said pump limit in dependence upon the result of said check; and wherein a new pump limit is formed when the pump limit is corrected in that a previous pump limit is reduced by a second pregiven value; and, the pump limit is corrected in a new driving cycle independently of the check as to the pumping of said compressor; and, a new pump limit is formed in that a previous pump limit is increased by a third pregiven value.

9. The method of claim 8, wherein said second pregiven value is selected greater than said third pregiven value.

10. A method for operating an internal combustion engine having a compressor, the method comprising the steps of:

limiting a pressure ratio across said compressor in dependence upon a mass flow through said compressor utilizing a pump limit to prevent a pumping of said compressor;

making a check in at least one operating state of said engine as to whether a pumping of said compressor occurs;

correcting said pump limit in dependence upon the result of said check; and, carrying out the correction of said pump limit in segments in dependence upon the mass flow through said compressor.

\* \* \* \* \*